Nov. 26, 1935.    R. J. WATERWORTH    2,022,098
WRINGER RELEASE AND PRESSURE CONTROL
Filed May 16, 1932    3 Sheets-Sheet 1

Inventor
ROBERT J. WATERWORTH,
BY Toulmin & Toulmin
Attorneys

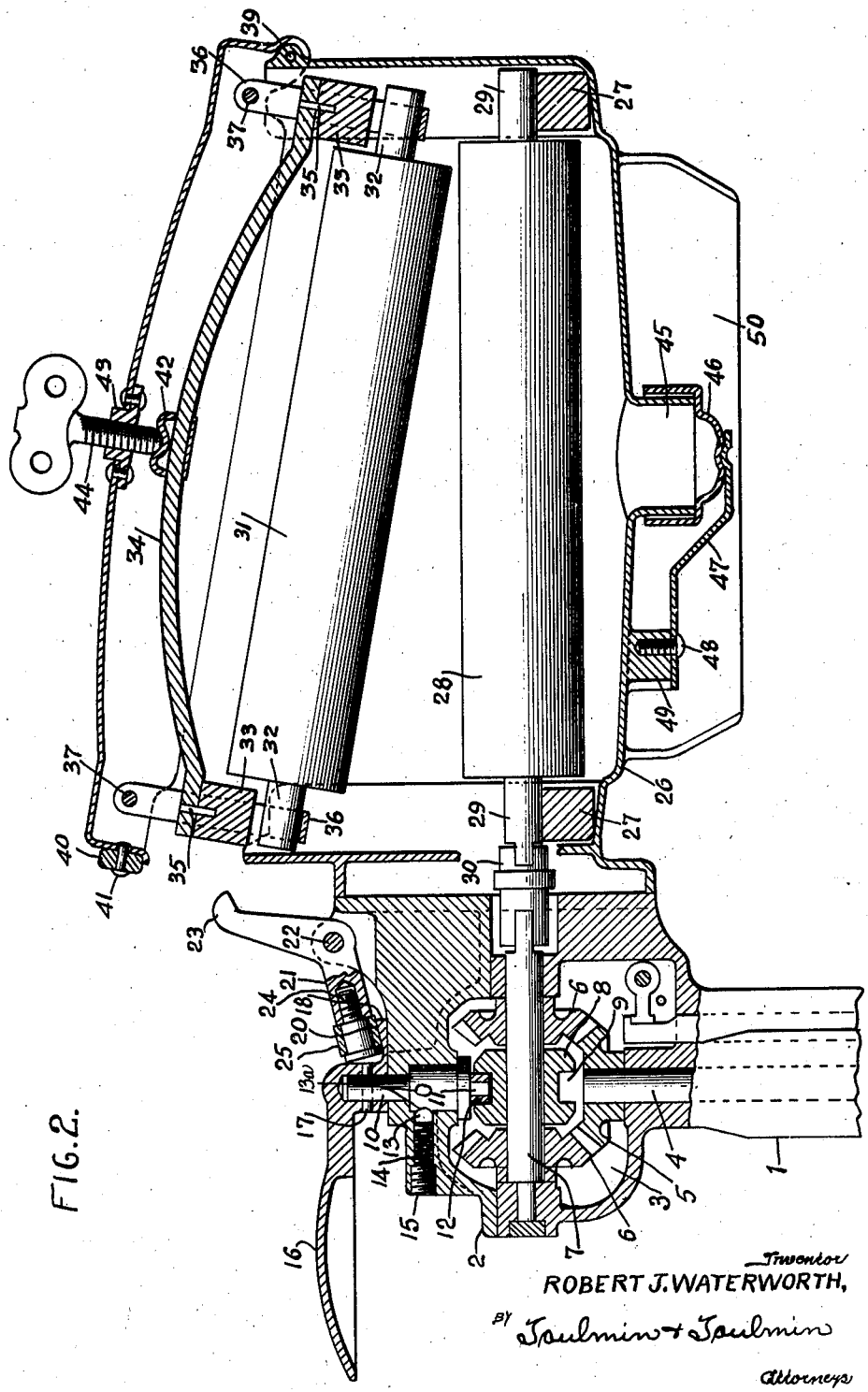

Nov. 26, 1935. R. J. WATERWORTH 2,022,098
WRINGER RELEASE AND PRESSURE CONTROL
Filed May 16, 1932 3 Sheets-Sheet 3
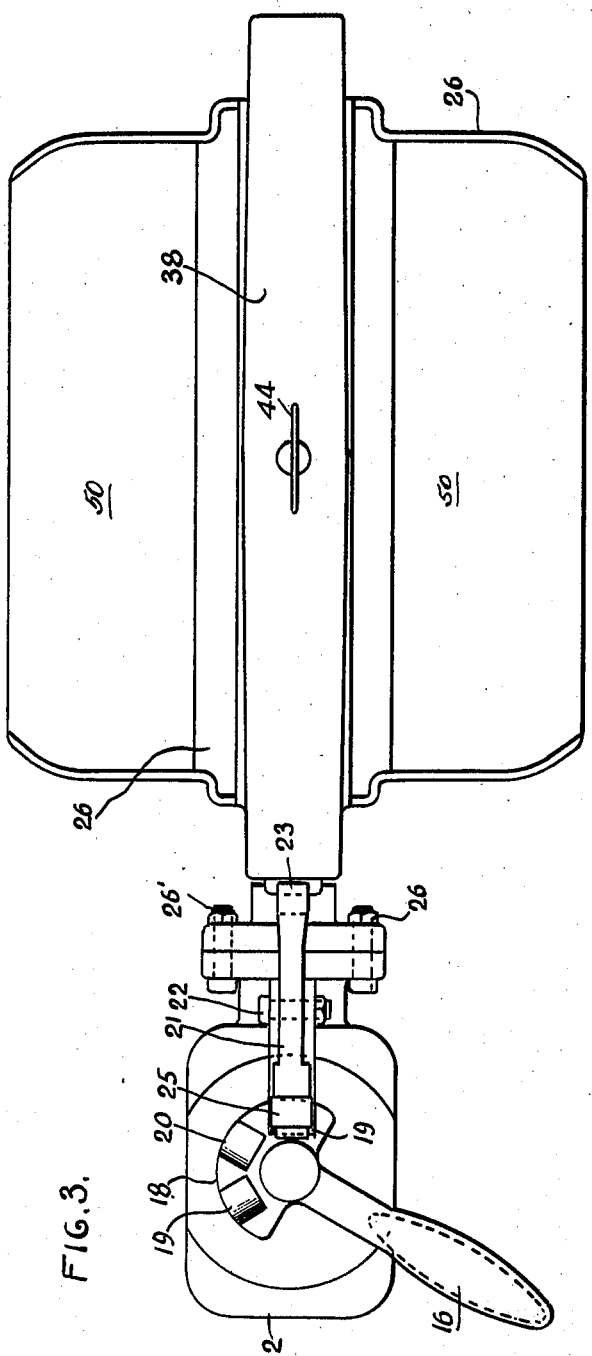
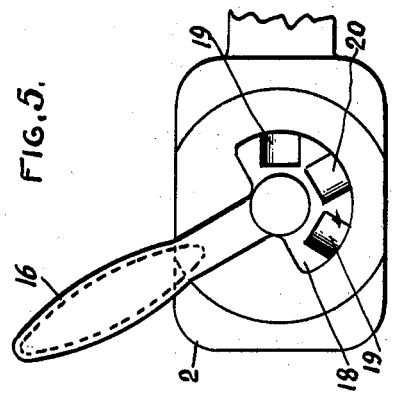
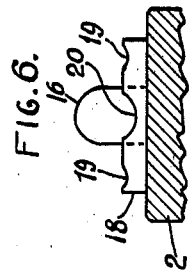
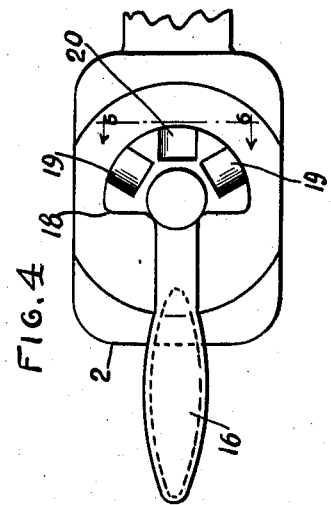
Inventor
ROBERT J. WATERWORTH,
BY Toulmin & Toulmin
Attorneys Patented Nov. 26, 1935

2,022,098

UNITED STATES PATENT OFFICE 2,022,098

WRINGER RELEASE AND PRESSURE CONTROL

Robert J. Waterworth, Sidney, Ohio, assignor to Prima Manufacturing Company Inc., Sidney, Ohio, a corporation of Ohio Application May 16, 1932, Serial No. 611,463

14 Claims. (Cl. 68—32)

This invention relates to improvements in wringers, and has for its object to provide, in connection with a wringer, means to apply or release the pressure on wringer rolls and to disconnect therefrom the power operating it.

It is also an object of this invention to provide, in connection with a wringer, a pressure applying and releasing means for the wringer rolls operated by a handle which also operates a clutch mechanism to disconnect the power from the wringer.

It is a further object of this invention to provide, in connection with the wringer, means to drain off the water therefrom and convey it to a tub or other suitable receptacle or container.

These and other advantages will appear from the following description taken in connection with the drawings.

Referring to the drawings:

Figure 2 is a similar section with the rollers spaced apart to relieve a jamming condition created by clothes becoming entangled in the rollers.

Figure 3 is a top plan view.

Figure 4 is a top plan view of the gear head showing the lever in neutral position.

Figure 5 is a top plan view of the gear head showing the lever in operative position.

Figure 6 is a section on the line 6—6 of Figure 4.

Figure 1:
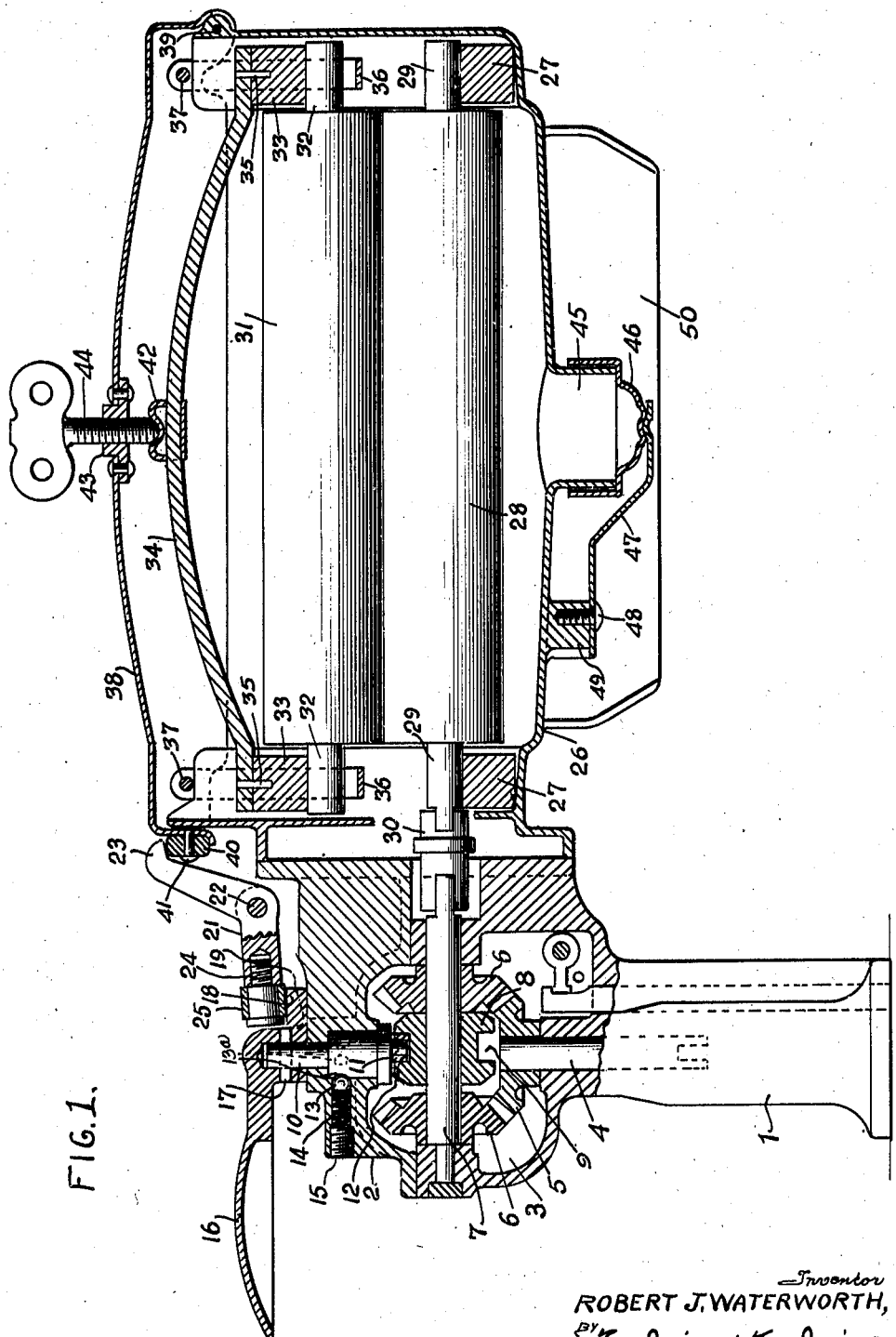
Figure 1 is a vertical, longitudinal section showing the rollers in operative position.

The present wringer is adapted to be used in connection with wash tubs, or may be used independently thereof, and for the purpose of supporting the wringer there is provided a standard 1, which has on its top or upper end a gear head 2 which forms a gear chamber 3. Extending upwardly through the standard and suitably mounted therein is an operating shaft 4, which has on its upper end a gear 5. This gear 5 meshes with two other gears 6, mounted upon a longitudinally arranged shaft 7 supported by suitable bearings in the gear head.

The gears 6 are loosely mounted on the shaft 7 and have on their inner faces clutch means for engaging similar clutch means located on a clutch spool 8, which is slidably mounted upon the shaft 7 but rotatable with the shaft so that when the clutch spool is engaged with one of the gears 6 the shaft 7 will rotate in one direction, whereas when the clutch spool is engaged with the other gear 6 the shaft 7 will rotate in the opposite direction. By this means the direction of rotation of the shaft 7 may be reversed.

On the periphery of the clutch spool is a groove 9 into which an eccentric pin 11, located eccentrically on a shaft 10, projects. Around the eccentric pin 11 is a roller 12, which serves as anti-friction means between the eccentric pin and the walls of the groove 9.

In the upper part of the gear head is a hole in which there is a ball 13 pressed by means of a spring 14 into suitable holes 13a in the shaft 10 for holding the shaft in different positions. There are three, suitably arranged around the periphery of the shaft for holding the shaft in three different positions of adjustment. In order to hold the spring against the ball 13 a plug 15 is provided, which closes the outer end of the hole in which the ball and spring are located.

On the upper end of the shaft 10 is a handle 16 attached thereto by means of a pin 17. In the position shown in Figure 1 the handle is turned to one side and not in line with the rollers. The position of the handle in Figure 1 is similar to that in Figures 3 and 5. The handle in Figure 1, in spite of the position it is in, is shown in full length for the purpose of illustration.

On the end of the handle and resting upon the head is an arcuate projection 18, which has on each side a lateral slot 19, and in line with the handle proper is a slot or notch 20. The central notch is deeper than the lateral notches so that when the handle is in neutral position, as shown in Figure 4, a release latch 21 pivoted to the head at 22 is in release position, as shown in Figure 2. In this figure the handle is also in neutral position.

On one end of the release latch is a hook 23, the purpose of which will be hereinafter described. The other end of the release latch has a hole therein, into which a screw 24 is threaded. This screw has between its end and the end of the release latch a roller 25, adapted to roll over the surface of the arcuate projection and to rest in any one of the seats or slots therein.

As shown in Figure 1, this roller is seated in one of the lateral slots, which is not as deep as the central slot 20. In Figure 2 this roller is seated in the central slot so that the hook 23 is out of engagement with a cooperating release member.

Suitably attached to one side of the gear head is a wringer casing 26. As shown in Figure 3, this casing is attached to the gear head by means of bolts 26'. In the lower part of the casing are two bearings 27, one at each end, for supporting trunnions 29 on a roller 28. This is the lower fixed operating roller, and for operative purposes there is a connection 30 between one of its trunnions and the shaft 7. This connection may be attached to the parts in any suitable manner. In the present instance, as shown in Figures 1 and 2, this connection has a slot in each end to receive a tongue on the end of the trunnion or the shaft.

Cooperating with the lower roller 28 is an upper roller 31, which has at each end a trunnion 32 fitting in a bearing 33, which is attached to one end of a bearing spring 34 by means of a pin 35. Cooperating with the bearings 33 for restricting the movements of the trunnions 32 are stirrups 36, supported by means of pins 37 on a top 38. These stirrups are also used for raising the upper roller when the top is lifted.

The top 38 is pivoted to the side of the casing 26 at the point 39, and has on its opposite side, adjacent the hook 23, a release block 40 which is attached to the top by means of a rivet 41. On the spring 34, intermediate its ends, is a centering clip 42 adapted to receive the lower end of a pressure screw 44 supported by means of a pressure plate 43, suitably located in the central part of the top 38. By means of this screw the relative position of the spring 34 can be adjusted in regard to the top 38.

In the lower part of the casing is a drain spout 45, which drains into a cup 46 fitting over the spout and supported by means of a spring 47, attached by means of a screw 48 to a stud 49 on the bottom of the casing 26. The cup 46 serves to close the spout 45 and thereby prevent any water from escaping from the wringer onto the floor, or any other support for the wringer. This cup, together with the spout, forms a sufficiently large cavity that a relatively large amount of water may be retained. This cup and spout will retain all of the drippings from the rollers so that the vessel for catching water may be removed from the wringer without water dripping from the wringer onto the floor. There is also provided on the bottom and at each side of the casing 26 an apron 50 for guiding the clothes from the wringer into a tub at either side of the wringer.

In the position shown in Figure 1 the rollers 28 and 31 are in wringing position, and are held in this position by means of the hook 23 and the release block 40. Should the clothes become wadded or caught in the rollers, the handle 16 is shifted from its operative position to a neutral position, such as shown in Figure 4. When the handle is in neutral position the roller 25 is seated in the groove 20. When the release latch is thus positioned the hook 23 is released from the release block 40 so that the roller 31 rises and relieves the pressure between it and the roller 28. At the same time the hook 23 releases the release block the clutch spool is shifted from engagement with one of the gears 6 to a neutral position so that the two gears 6 may rotate without rotating the shaft 7.

When it is desired to again operate the rollers they are brought back to the position shown in Figure 1. The direction of rotation of the rollers depends upon which one of the gears 6 is engaged by the clutch spool, and this is determined by the movement of the handle 16. As shown in Figure 3, the clutch spool engages one of the gears 6, while in Figure 5 the handle is in position for the clutch spool to engage the other of the gears 6. By positioning the handle in the manner shown in Figures 3 and 5 the direction of rotation of the rollers is determined.

It will be understood that I desire to comprehend within my invention such modifications as come within the scope of my claims and my invention.

Having thus fully described my invention, what I claim as new and desire to secure by Letters Patent, is:

1. In a wringer, a frame having separable pivoted sections, each section supporting a roller, a latch to fasten the sections together, means to cause one roller to rotate, and a lever pivotally mounted in proximity to the latch to release the latch and disconnect said means from said one roller, said lever having thereon an arcuate projection radially disposed as to the pivot and provided with latch receiving notches of different depths.

2. In a wringer, a frame having separable pivoted sections, each section supporting a roller, a latch to fasten the sections together, means to cause one roller to rotate, and a lever pivotally mounted in proximity to the latch, said lever having an arcuate notched projection radially disposed as to the pivot to release the latch, said lever being provided with means to disconnect the means to rotate one of the rollers.

3. In a wringer having a wringer head, a pair of rollers, means to fasten the rollers together including a latch having a catch at one end to engage fastening means on one of the rollers, and a rotatable member on the other end, a lever pivotally mounted on the wringer head and having means including an arcuate projection with notches of different depths on the face thereof to receive the rotatable member and actuate the latch to release the rollers.

4. In a wringer including a head, a pair of relatively movable rollers, means to fasten the rollers against relative movement, said means comprising a pivoted latch member having a hook on one end for engaging a part of the fastening means on one of the rollers and a rotating member on the other end, power transmitting means in said head and including a reversing means to cause one of said pair of rollers to rotate, a lever mounted on said head, means on the lever to engage the rotating member to operate the latch member, and means actuated by the lever to operate the reversing means to control the rection of rotation of said one roller.

5. In a wringer having a head, a fixed roll roller movable with relation to the fixed roller, means to fasten the last-named roller against movement with relation to the fixed roller, said means including a latch having a hook on one end for engaging fastening means on the movable roller and a roller on the other end, a lever mounted on the head, a shaft having operative connection with the fixed roller, means on said shaft operated by the lever to control the direction of rotation of the shaft, and means on the lever engaging the latch roller to operate the latch.

6. In a wringer having a head, a fixed roller, a roller movable with relation to the fixed roller, means to fasten the last-named roller against movement with relation to the fixed roller, said means including a latch having a hook on one end for engaging fastening means on the movable roller and a roller on the other end, a lever mounted on the head having cam surfaces thereon engaging the latch roller to operate the latch, a shaft having operative connection with the fixed roller, and means on the shaft operated by the lever to control the direction of rotation of the shaft.

7. In a wringer having a head, a fixed roller, a movable roller, means to fasten the movable roller with relation to the fixed roller, said means including a latch having holding means at one end to engage fastening means on the movable roller, a lever on the head having an arcuate projection with notches of different depths to engage the other end of the latch to operate it, a shaft connected to the fixed roller to rotate it, and means on the shaft operated by the lever to rotate the shaft and control the direction of rotation of the shaft.

8. In a wringer having a head, a casing having a roller, a top for the casing, a roller supported by the top, means to lock the top on the casing said means including a latch member adapted to engage the top, a shaft operatively connected to the casing roller, and a lever mounted on the head having thereon means to force and hold the latch member in engagement with the top and means to control the direction of rotation of the shaft.

9. In a wringer having a head, a casing having a roller, a top member having a roller therein, means to lock the top on the casing, said means including a latch member adapted to engage the top, a shaft operatively connected to the casing roller, a lever mounted on the head, a cam member on the lever to operate the latch member, and means on the shaft operated by the lever to control the direction of rotation of the shaft.

10. In a wringer, a standard having a gear head thereon, a casing supported on the head, a top pivoted to the casing, a pair of rollers in the casing, one roller being carried by the top, a latch for holding the top on the casing, means to rotate and reverse the rollers, and a lever for operating the latch and for reversing the direction of rotation of the rollers.

11. In a wringer, a standard having therein a driven shaft, a roller operatively connected to said shaft, a second roller pivotally supported to bodily swing away from the first roller, a latch secured in operative relation to the standard and the rollers to hold the pivoted roller in relation to the first roller, a lever secured in operative relation to the latch, a cam on the lever operatively related to the latch, and means on the shaft cooperating with the lever to control the direction of rotation of the shaft, said lever being adapted to be moved in one direction for the rotation of the shaft in one direction and for moving the cam to lock the latch to hold the second roller, and adapted to be moved in another direction for the rotation of the shaft in another direction and for moving the cam to lock the latch to hold the second roller.

12. In a wringer, a casing having therein a fixed roller, a top pivoted to the casing, a roller loosely supported by said top, a latch for locking the top on the casing with the second roller against the first roller, means for rotating the first roller, and a lever on the casing adapted in one position to disconnect the means for rotating the first roller and to release the latch and adapted in either of two other positions to hold the latch in top-locking position and to cause the first roller to rotate in one direction or the other.

13. In a wringer, a casing, a pair of cooperating rollers in the casing, means to rotate said rollers, a drain spout in said casing, a cup for fitting on said spout, and a spring attached to the casing and engaging the bottom of the cup for supporting the cup.

14. In a wringer, a casing, a pair of cooperating rollers in the casing, means to rotate the rollers, a drain opening in said casing, a cup for fitting over the opening, and a stud on the casing having a spring attached thereto and engaging the bottom of the cup for supporting the cup.

ROBERT J. WATERWORTH.